US008762830B2

(12) United States Patent
Prebble

(10) Patent No.: US 8,762,830 B2
(45) Date of Patent: Jun. 24, 2014

(54) RENDERING DATA IN THE CORRECT Z-ORDER

(75) Inventor: Tim Prebble, Longmont, CO (US)

(73) Assignee: Konica Minolta Laboratory U.S.A, Inc., San Mateo, CA (US)

( * ) Notice: Subject to any disclaimer, the term of this patent is extended or adjusted under 35 U.S.C. 154(b) by 198 days.

(21) Appl. No.: 12/828,163

(22) Filed: Jun. 30, 2010

(65) Prior Publication Data

US 2012/0005568 A1   Jan. 5, 2012

(51) Int. Cl.
*G06F 17/00* (2006.01)
(52) U.S. Cl.
USPC ........... 715/234; 715/201; 345/418; 345/629; 382/232; 382/233
(58) Field of Classification Search
USPC ......... 715/201, 227, 234, 243, 247, 251, 257, 715/700, 738, 744, 760, 764, 781, 788, 810, 715/843, 855, 239; 345/173, 419, 581–582, 345/619, 629, 660, 418, 422; 358/1.14–1.15, 1.18, 1.9, 3.28; 382/145, 232–233; 705/14.72, 26.1
See application file for complete search history.

(56) References Cited

U.S. PATENT DOCUMENTS

2007/0236733 A1   10/2007   Guarnieri et al.

FOREIGN PATENT DOCUMENTS

| JP | H06-314278 A | 11/1994 |
| JP | 2003-195994 A | 7/2003 |
| JP | 2007-279831 A | 10/2007 |

OTHER PUBLICATIONS

S. Fulton,"Office 2007 SP2 is released, can indeed save ODF by default," Apr. 28, 2009, downloaded from <"http://betanews.com/2009/04/28/office-2007-sp2-is-released-can-indeed-save-odf-by-default/">, 3 pages.*
F. F Mittlebach et al.,"The Latex Companion, Second Edition," Addison-Wesley Professional, © Apr. 22, 2004, pp. 1-14 (Chapter 1, Introduction), pp. 593-646 (Chapter 10, Graphics Generation and Manipulation), 70 total pages.*
S. Johnson,"Microsoft Office Word 2007 on Demand," © Feb. 13, 2007, Que, pp. 1-2, 12-15, 18-19, 22-25, 34, 36-38, 107-109, 170-1757, 190, 280,28 total pages.*
M. Brauer et al.,"Open Document Format for Office Applications (Open Document) v1.0, OASIS Standard," May 1, 2005, OASIS, 706 pages.*
A. Dunn,"Using PostScript with TeX," TUGboat, vol. 8 (1987), No. 2, pp. 171-173.*

(Continued)

*Primary Examiner* — Cesar Paula
*Assistant Examiner* — James H Blackwell
(74) *Attorney, Agent, or Firm* — Osha Liang LLP

(57) ABSTRACT

A method includes receiving a document encoded in a markup language, having a page with an image and text, and creating a first high-level graphics (HLG) object corresponding to the image. The first HLG object specifies a first z-index less than zero for the first HLG object. The method further includes generating a first entry in an input file including a pointer to the first HLG object, generating a second entry in the input file corresponding to the text, and generating an output file using a typesetting program and the input file. In response to the first z-index not being zero, the method includes parsing the output file to identify the page, creating the page ItemHandles List (IL), and adding a first ItemHandle including the pointer and corresponding to the first entry to the IL. The method further includes generating a display list using the output file and the IL.

25 Claims, 10 Drawing Sheets

(56) References Cited

OTHER PUBLICATIONS

WC: "Cascading Style Sheets, level 2 CSS2 Specification", Internet Citation, May 12, 1998, XP002464343, retrieved from the Internet: URL:http://www.w3.org/TR/REC-CSS2/css2.pdf, pp. 125-127 and abstract.

Alberg et al.: "Open Document Format for OfficeApplications (OpenDocument) v1.0", May 1, 2005, pp. 285-299, URL: https://www.oasis-open.org/committees/download.php/12572.

European Search Report for Application No. 11 16 9793 dated Sep. 3, 2013 (3 pages).

Sakai K.; "Attempts of Automatic Composition from SGML Document;" Japan Printer, vol. 80, No. 3; Apr. 15, 1997 (10 pages).

Isozaki, H.; "Latex with Perfect Freedom;" Computer Today Library 5, First Edition; Jul. 10, 1992 (10 pages).

Notification of Reasons for Refusal in related Japanese Patent Application No. 2011-143975, mailed Mar. 4, 2011 (6 pages).

* cited by examiner

US 8,762,830 B2

RENDERING DATA IN THE CORRECT Z-ORDER

CROSS-REFERENCE TO RELATED APPLICATIONS

The present U.S. patent application includes subject matter that may be related to the subject matter in U.S. patent application Ser. No. 12/651,093, filed on Dec. 31, 2009, and having the same inventor as the present U.S. patent application.

BACKGROUND

Document processing software allows users to view, edit, process, store, and print documents conveniently. Documents are typically described in a markup language format. The markup language format describes the content (including text and images), location of the content, and the format of the content (including color and font) within a document. The markup language typically does not provide sufficient information on how the document is to be rendered on a display or printed.

When a document described using a markup language is rendered, a typesetting program may be used to determine how to layout the content in the document in order for the document to be displayed or printed. For example, a typesetting program such as TeX may be used to typeset the document prior to displaying or printing the document and, in particular, specify the format and position of printable data on a screen or page(s). More specifically, typesetting programs take unformatted text and commands as input and produce formatted (laid-out) text as output.

Conventional typesetting programs may not be able to process all items defined using a markup language, such as Office Open eXtensible Markup Language ("OOXML"). For example, the typesetting program may not include functionality to process vector graphic and/or image data.

SUMMARY

In general, in one aspect, the invention relates to a computer readable medium comprising computer readable program code embodied therein for causing a processor to perform a method. The method comprises: receiving a document encoded in a markup language; parsing the document to identify an image and text; creating a first high-level graphics (HLG) object corresponding to the image, wherein the first HLG object specifies a first z-index for the first HLG object and wherein the first z-index is less than zero; generating a first entry in a typesetting program input file comprising a pointer to the first HLG object; generating a second entry in the typesetting program input file corresponding to the text; generating a typesetting program output file using a typesetting program and the typesetting program input file; making a determination that the z-index for the first HLG object is not equal to zero; based on the determination: parsing the typesetting output file to identify a page of the document, wherein the text and the first HLG object are located on the page; creating an ItemHandles List for the page; adding a first ItemHandle corresponding to the first entry to the ItemHandles List, wherein the first ItemHandle comprises the pointer to the first HLG object; and generating a display list for the page using the typesetting program output file and the ItemHandles List.

In general, in one aspect, the invention relates to a printer. The printer comprises: a processor; memory comprising computer readable program code, which when executed by the processor, causes the printer to perform a method, the method comprising: receiving a print job for a document, wherein the document is encoded in a markup language; parsing the document to identify an image and text; creating a first high-level graphics (HLG) object corresponding to the image, wherein the first HLG object specifies a first z-index for the first HLG object and wherein the first z-index is less than zero; generating a first entry in a typesetting program input file comprising a pointer to the first HLG object; generating a second entry in the typesetting program input file corresponding to the text; generating a typesetting program output file using a typesetting program and the typesetting program input file; making a determination that the z-index for the first HLG object is not equal to zero; based on the determination: parsing the typesetting output file to identify a page in the print job, wherein the text and the first HLG object are located on the page; creating an ItemHandles List for the page; adding a first ItemHandle corresponding to the first entry to the ItemHandles List, wherein the first ItemHandle comprises the pointer to the first HLG object; and generating a display list for the page using the typesetting program output file and the ItemHandles List; and a print engine configured to print the document, using the printable format document.

In general, in one aspect, the invention relates to a computer readable medium comprising computer readable program code embodied therein for causing a processor to perform a method. The method comprises: receiving a document encoded in a markup language; parsing the document to identify an image and text; creating a first high-level graphics (HLG) object corresponding to the image, wherein the first HLG object specifies a first z-index for the first HLG object and wherein the first z-index is less than zero; generating a first entry in a typesetting program input file comprising a pointer to the first HLG object; generating a second entry in the typesetting program input file corresponding to the text; generating a first typesetting program output file using a typesetting program and the typesetting program input file; parsing the first typesetting output file to generate first parsed data; using the first parsed data: creating an ItemHandles List for a page in the document; adding a first ItemHandle corresponding to the first entry to the ItemHandles List, wherein the first ItemHandle comprises the pointer to the first HLG object; and generating a second typesetting program output file using a typesetting program and the typesetting program input file; parsing the second typesetting output file to generate second parsed data; generating a first display list entry for the first entry using the second parsed data and the ItemHandles List; and generating, after generating the first display list entry, a second display list entry for the second entry using the second parsed data.

Other aspects of the invention will be apparent from the following description and the appended claims.

DETAILED DESCRIPTION

Figure 1:
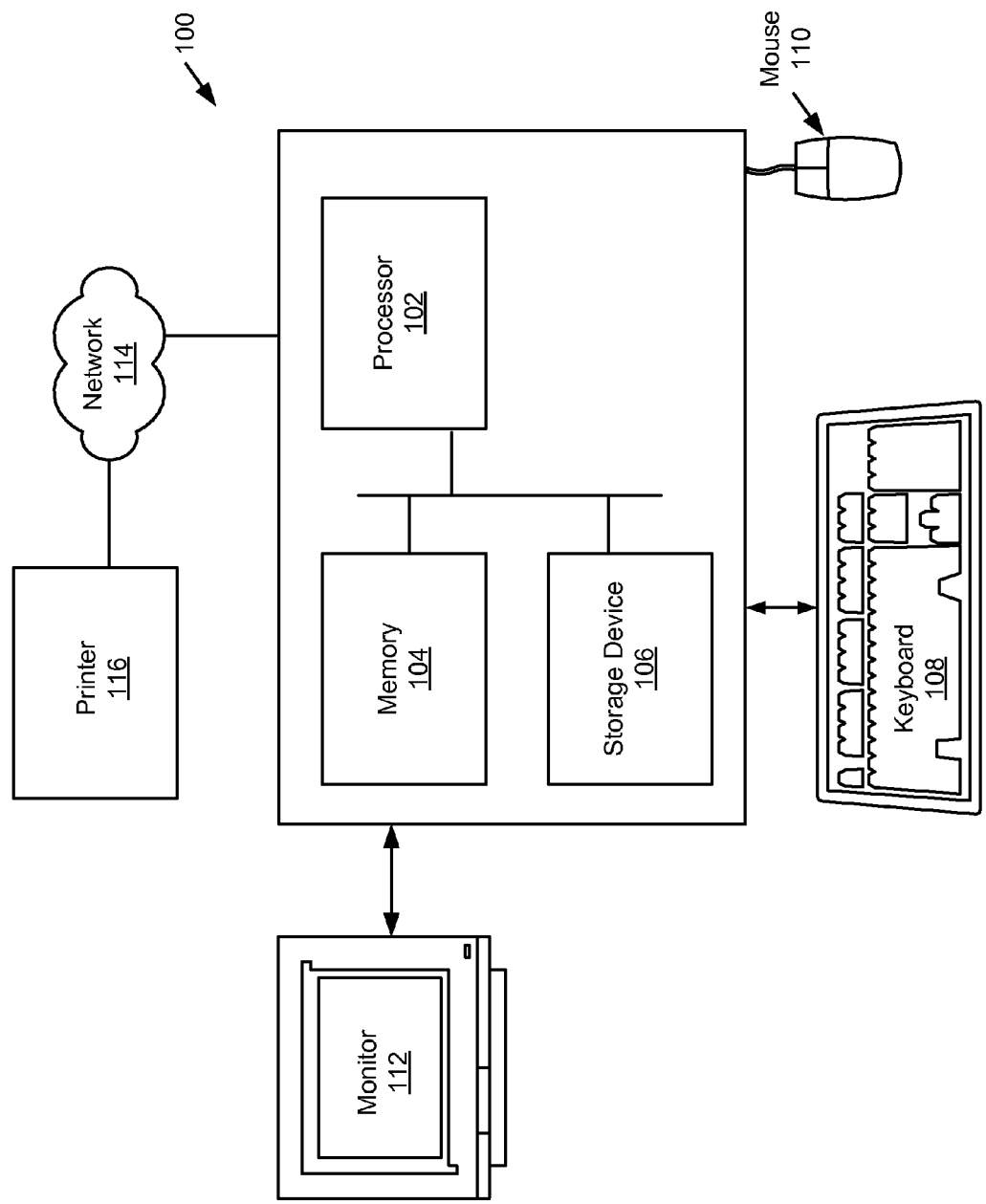
FIG. 1 shows a computer system in accordance with embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to using typesetting programs with markup languages, where the typesetting programs do not have native functionality to support all items specified by the markup languages. More specifically, embodiments of the invention relate to generating a display list in a correct z-order, where the typesetting programs do not natively support processing of z-order but the markup languages allow document processing programs to set a z-index of an item in the document.

In one embodiment of the invention, a document generated by a document processing program, such as but not limited to Microsoft® Word, includes items such as text, images, and vector-graphics. Microsoft is a registered trademark of Microsoft Corporation, located in Seattle, Wash. In one embodiment of the invention, the document processing program represents documents in a markup language format such as OOXML. Further, in one embodiment of the invention, processing a document in a markup language format results in the creation of a one or more High-Level Graphics (HLG) objects, which correspond to the images or vector-graphics in the document.

In one embodiment of the invention, each item (i.e., text, images, or vector-graphics) on the document may be positioned using x and y coordinates. Further, each HLG object (which corresponds to an image or vector-graphics in the document) may be positioned using an additional coordinate, z-index. The z-index specifies whether the HLG object is below, in-line with, or above the level of main text. Said another way, the main text in the document (e.g., text that is not in a textbox) is located on the in-line plane of the document. Further, the HLG objects may be located: (i) below the in-line plane, for example, as background images; (ii) on the in-line plane as the text, for example, placed beside the text; or (iii) above in-line plane, for example, as an overlaid image.

Figure 5:
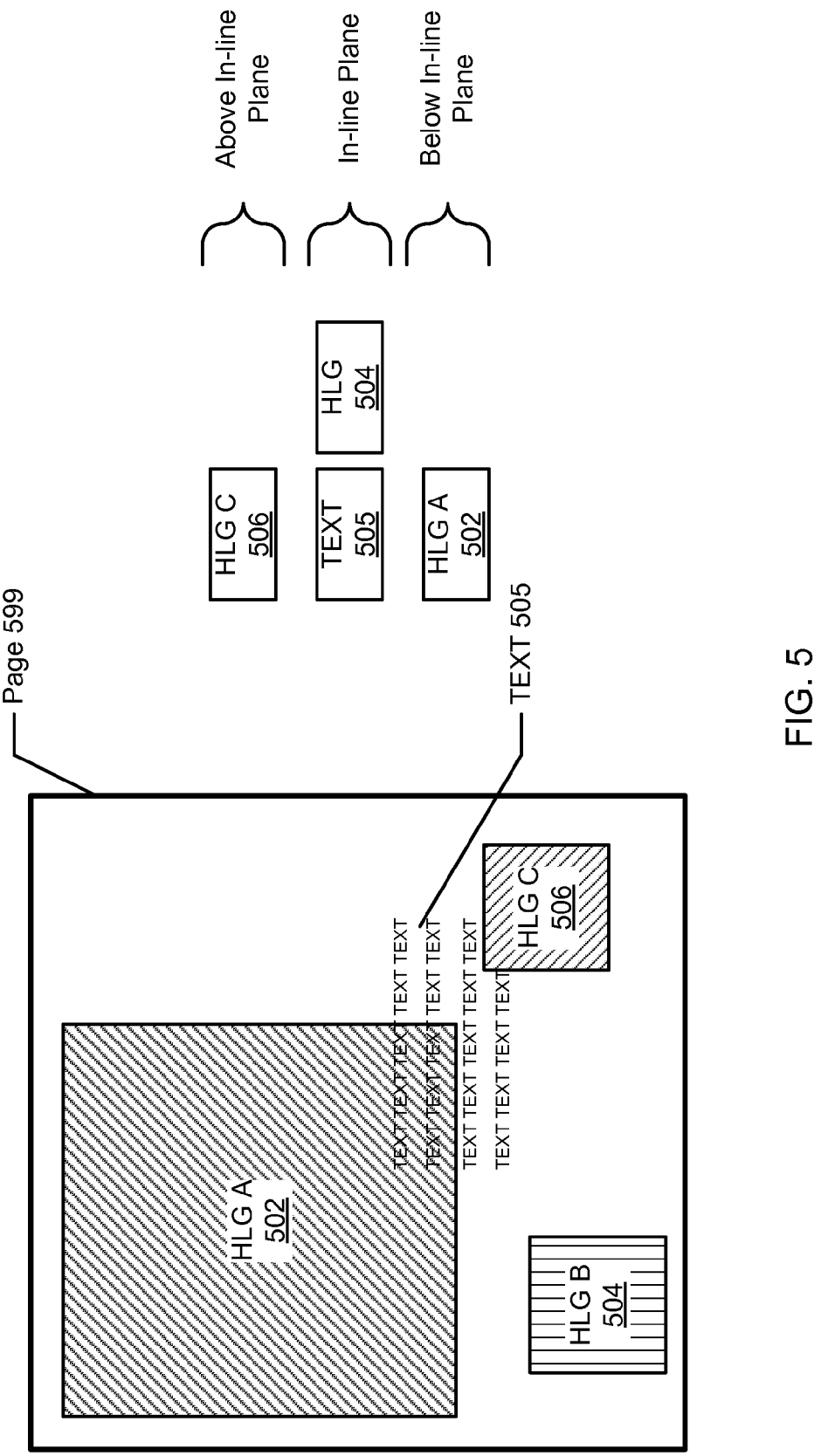
FIGS. 5 and 6 show examples in accordance with embodiments of the invention.

In one embodiment of the invention, a z-index <0 indicates that the HLG object is located below the in-line plane, a z-index=0 indicates that the HLG object is located in the in-line plane, and a z-index >0 indicates that the HLG object is located above the in-line plane. In one or more embodiments of the invention, the z-index may be specified as an integer or a real number. Those skilled in the art will appreciate that other conventions may be used to indicate whether the given HLG object is below the in-line place, in the in-line plane, or above the in-line plane. FIG. 5 shows an example of a page with HLG objects in the various planes described above.

FIG. 1 shows a computer system in accordance with embodiments of the invention. As shown in FIG. 1, the computer system (100) includes one or more computing processor(s) (102), associated memory (104) (e.g., random access memory (RAM), cache memory, flash memory, etc.), an internal and/or an external storage device (106) (e.g., a hard disk, an optical drive such as a compact disk drive or digital video disk (DVD) drive, a flash memory stick, universal serial bus (USB) drive, smart card, etc.), and numerous other elements and functionalities typical of today's computers (not shown). The system (100) may also include input means, such as a keyboard (108), a touch screen (which may be implemented in the monitor (112)), a mouse (110), or a microphone (not shown). Further, the computer system (100) may include output means, such as a monitor (112) (e.g., a liquid crystal display (LCD), a plasma display, or cathode ray tube (CRT) monitor) and a printer (116). The computer system (100) may be connected to a network (114) (e.g., a local area network (LAN), a wide area network (WAN) such as the Internet, or any other type of network) via a network interface connection wired or wireless (not shown). As shown in FIG. 1, the computer system is configured to connect to the printer (116) using the network (114). Additionally, or alternatively, the computer system may include functionality to directly communicate with the printer using a direct wired or wireless communication mechanisms such as, but not limited to, Bluetooth®, a wired connection, a peer-to-peer network, etc. Bluetooth is a registered trademark of Bluetooth SIG, Inc. located in Bellevue, Wash., USA.

Those skilled in the art will appreciate that many different types of computer systems exist, and the aforementioned input and output means may take other forms. Generally speaking, the computer system (100) includes at least the minimal processing, input, and/or output means necessary to practice embodiments of the invention.

Figure 2:
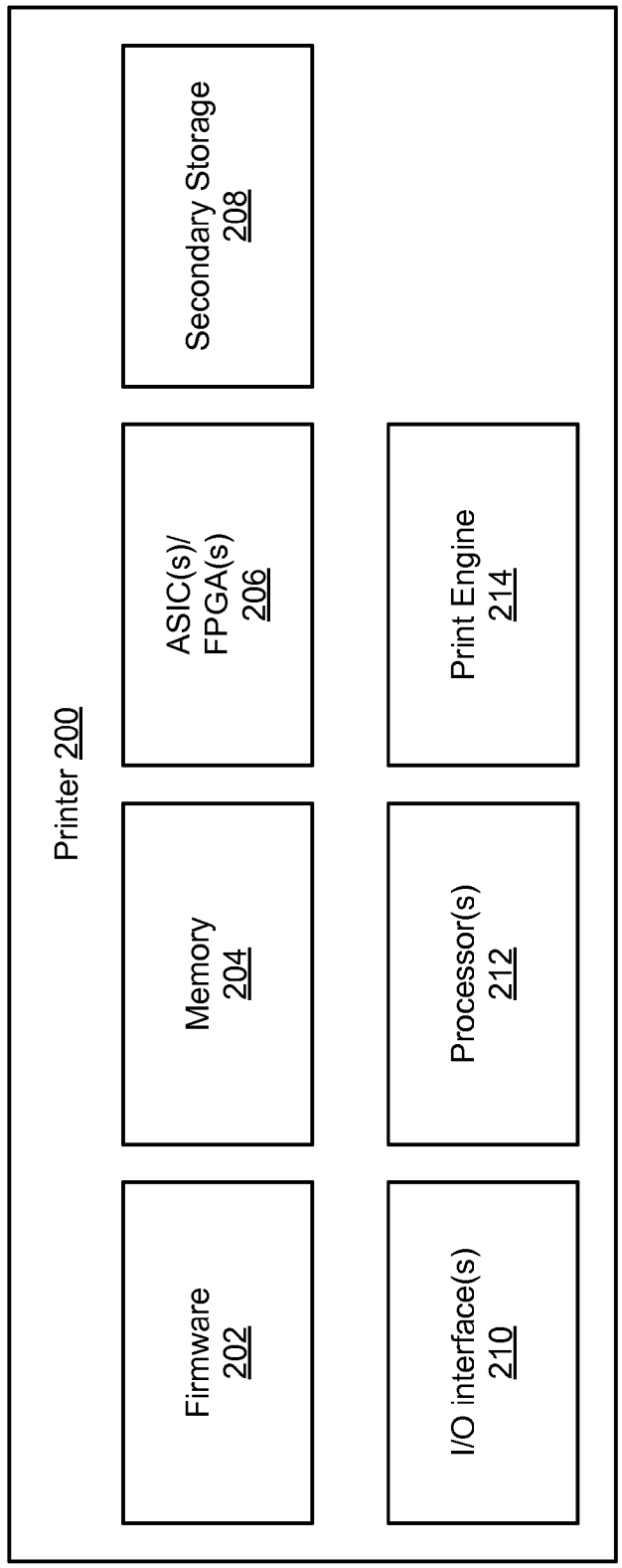
FIG. 2 shows a printer in accordance with embodiments of the invention.

FIG. 2 shows a printer in accordance with embodiments of the invention. The printer (200) includes firmware (202), memory (204), application-specific integrated circuit(s)/Field Programmable Gate Arrays (FPGA) (206), secondary storage (208), an Input/Output interface(s) (210), processor(s) (212), and a print engine (214). Each of these components is described below.

In one embodiment of the invention, the firmware (202) may include computer readable program code for execution by the processor (212) and/or ASICs/FPGAs (206). In one embodiment of the invention, the computer readable program code includes instructions to perform one or more of the steps shown in FIGS. 3 and 4A-4D. In addition, the computer readable program code may include instructions for booting-up and shutting down the printer as well as instructions for sending and receiving data from devices external to the printer (200).

In one embodiment of the invention, the memory (204) may include volatile (e.g., random access memory (RAM), cache memory, etc.) and/or non-volatile memory (e.g., flash memory, etc.). The memory may be configured to store data generated during the performance of one or more method steps shown in FIGS. 3 and 4A-4D.

In one embodiment of the invention, the secondary storage (208) corresponds to non-volatile memory (e.g., flash memory, etc.) and/or an external storage device (e.g., a hard disk). The secondary storage device (208) may include data generated during the performance of one or more method steps shown in FIGS. 3 and 4A-4D.

In one embodiment of the invention, the Input/Output interface(s) (210) are configured to send data to devices external to the printer and/or to receive data from devices external to the printer. Examples of I/O interfaces include, but are not limited to, a wireless network interface, a wired network interface, a serial interface, a Universal Serial Bus (USB) interface, a Bluetooth® interface, and a parallel interface.

In one embodiment of the invention, the processor(s) (212) is configured to execute the computer readable program code stored in the firmware (202) and, if present, in the secondary storage.

Optionally, the printer may include ASICs and/or FPGAs (206). The ASICs and/or FPGAs may include specialized hardware to facilitate the execution of the computer readable program code. Alternatively, or in addition to, the ASICs and/or FPGAs may be configured to perform one or more of the method steps shown in FIGS. 3 and 4A-D. In such embodiments, the computer readable program code may include the appropriate method calls to have the ASICs and/or FPGAs perform the one or more of the method steps shown in FIGS. 3 and 4A-D, for which they are configured.

In one embodiment of the invention, the print engine (214) is configured to generate the printed document. Accordingly, the print engine may include functionality to affix the toner and/or ink to the print medium, e.g., paper, plastic, etc. The printer (200) may be implemented as a laser printer, an inkjet printer, or a copier.

FIGS. 3 and 4A-4E show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

Figure 3:
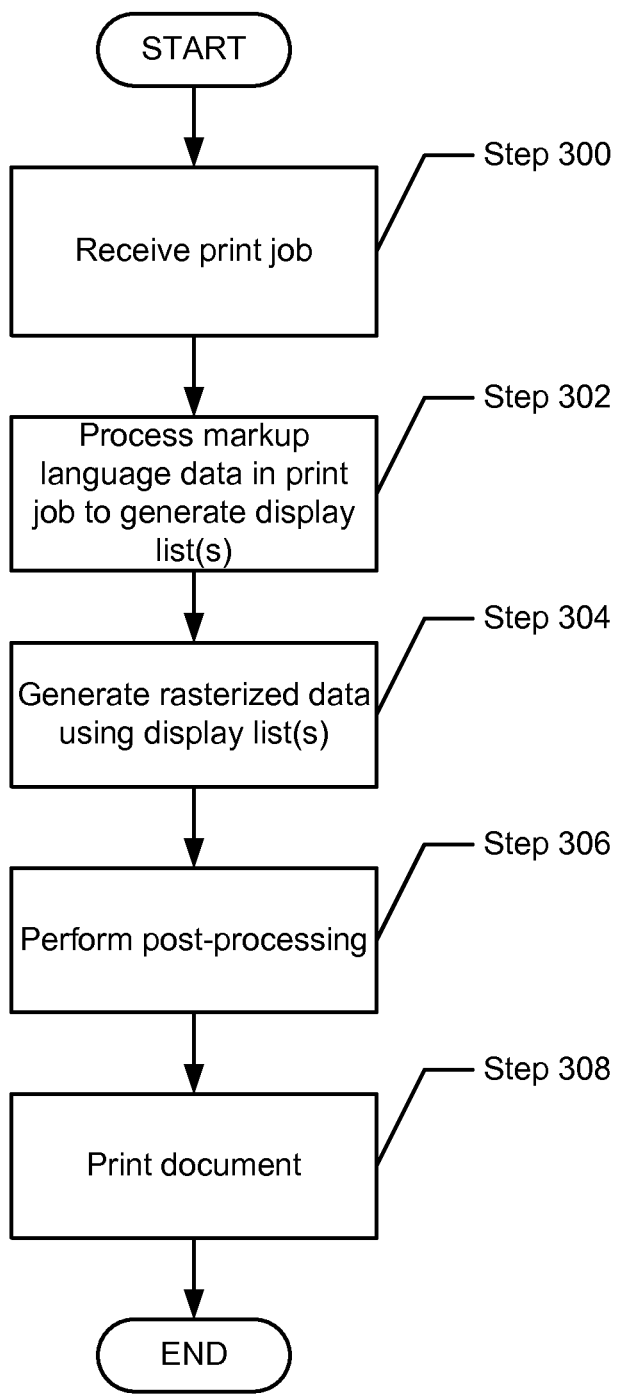
FIGS. 3 and 4A-4E show methods in accordance with embodiments of the invention.

Referring to FIG. 3, in Step 300, a print job is received by the printer, where the print job is for a document encoded in a markup language (e.g., OOXML). In Step 302, the markup language data corresponding to the document is processed to generate a display list. In one embodiment of the invention, the display list includes all of the information required to rasterize the content on a page in the document. Examples of the aforementioned information may include, but are not limited to, information describing the geometry of vector graphics, information describing the image data, information describing attributes of text, images, and vector graphics such as color, and opacity. Embodiments of Step 302 are described below with respect to FIGS. 4A-4E.

In Step 304, rasterized data for the document is generated using the display list. Non-limiting examples of rasterized data include a pixmap, which is a spatially mapped array of pixels, and a bitmap, which is a spatially mapped array of bits. In one embodiment of the invention, generating the rasterized data may be accomplished by taking a three-dimensional scene, typically described using polygons, and rendering the three dimensional scene onto a two-dimensional surface. In such cases, the polygons may be represented as collections of triangles. A triangle may be represented by three vertices in the three-dimensional space. A vertex defines a point, an endpoint of an edge, or a corner of a polygon where two edges meet. Thus, the rasterization may transform a stream of vertices into corresponding two-dimensional points and fill in the transformed two dimensional triangles. Upon rasterization, the rasterized data may be stored in memory on the printer. In Step 306, optionally, post-processing may be performed. For example, various operations such as half-toning, trapping, etc. may be carried out on the rasterized data. In Step 308, the rasterized data is used by the print engine to generate the printed medium (i.e., hardcopy document) having an image of the document affixed thereon.

Figure 4A:
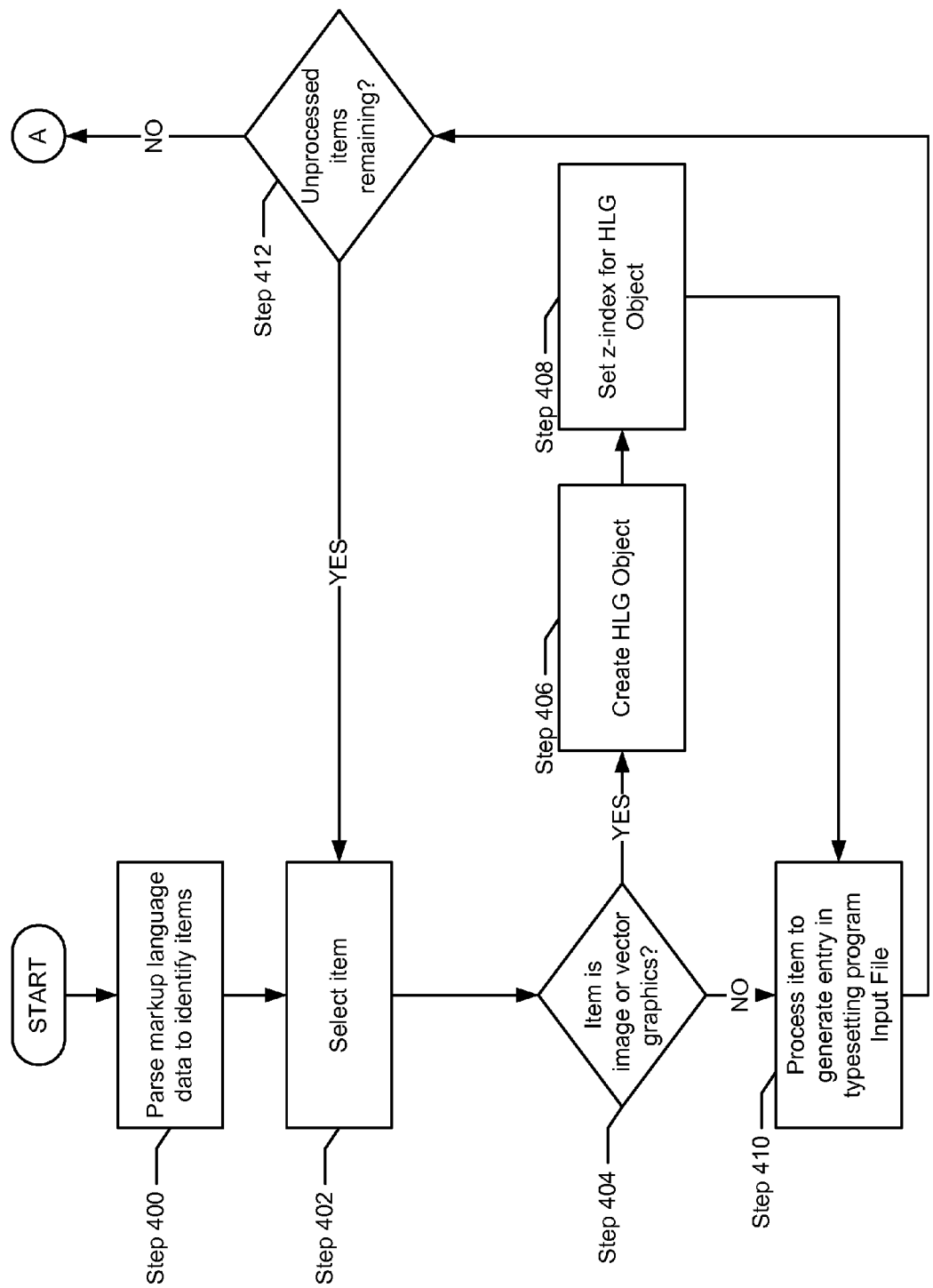

FIGS. 4A-4E describe various embodiments of Step 302 in FIG. 3. Referring to FIG. 4A, in Step 400, the markup language data is parsed to identify items in the document, such as text, vector graphics, and images.

In Step 402, an item to process is selected. In Step 404, a determination is made about whether the item corresponds to vector graphics or an image. If the item corresponds to vector graphics or an image, the method proceeds to Step 406; otherwise, the method proceeds to Step 410. In Step 406, an HLG object corresponding to the vector graphics or image is created. In Step 408, the z-index for the HLG object is set using information obtained from the parsing of the markup language data in Step 400. The process then proceeds to Step 410.

In Step 410, an entry for the item identified in Step 402 is generated in the Typesetting Program Input File. In one embodiment of the invention, the Typesetting Program is TeX. Those skilled in the art will appreciate that the invention may be extended to cover other Typesetting Programs. For items corresponding to the vector graphics or images, the generated entry includes a pointer to the HLG object (generated in Step 406). In one embodiment of the invention, items corresponding to HLG objects are encapsulated in commands that are ignored by the Typesetting Program Layout Engine. For example, if the Typesetting Program is TeX, then the items corresponding to the HLG objects may be encapsulated with "\special" commands. In this embodiment, the TeX Layout Engine ignores all items encapsulated with a "\special" command. Continuing with FIG. 4A, in Step 412, a determination is made about whether there are any additional items to process. If there are additional items to process, the method proceeds to Step 402; otherwise, the method proceeds to Step 413 in FIG. 4B.

At this stage, the Typesetting Program Input File has been generated. The Typesetting Program Input File is subsequently processed, as described in FIGS. 4B-4E, to generate a corresponding display list.

Figure 4B:
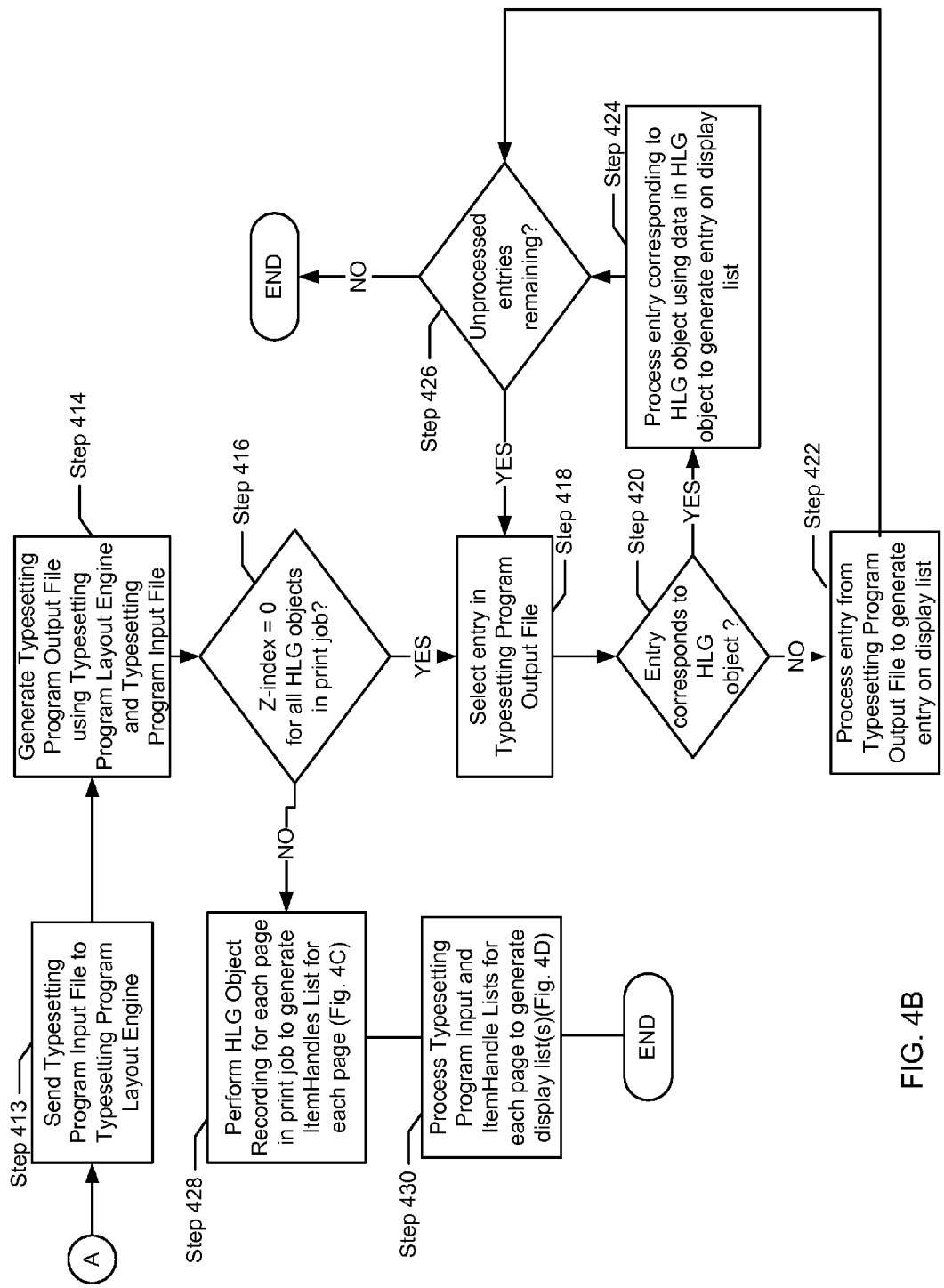

Referring to FIG. 4B, in Step 413, the Typesetting Program Input File is forwarded to the Typesetting Program Layout Engine (e.g., TeX layout engine). In Step 414, the Typesetting Program Layout Engine generates a Typesetting Program Output File using the Typesetting Program Input File. The Typesetting Program Output File includes, but is not limited to, pointers to the HLG objects, the layout of the HLG objects (determined using the corresponding bounding box information), the text on the in-line plane of the document, font of the text, color of the text, and begin-page and end-page indicators. In one embodiment of the invention, the Typesetting Program Output File is in Device Independent file format (DVI).

In Step 416, a determination is made about whether all HLG objects in the Typesetting Program Input File have a z-index=0. If all HLG objects in the Typesetting Program Input File have a z-index=0, the method proceeds to Step 418, otherwise the method proceeds to Step 428.

In Step 418, the processing of the Typesetting Program Output File is initiated with the parsing of the Typesetting Program Output File to obtain entries in the Typesetting Program Output File, one of which is subsequently selected. In Step 420, a determination is made about whether the entry corresponds to an HLG object. If the entry does not correspond to an HLG object, then the method proceeds to Step 422; otherwise the method proceeds to Step 424.

In Step 422, the entry is processed to generate a corresponding entry in the display list. The process then proceeds to Step 426. In Step 424, the entry is processed to generate a corresponding entry in the display list. The process then proceeds to Step 426. In one embodiment of the invention, the processing Step 424 may include (i) using a reference to the native image data in the HLG object, if the HLG object is for an image (as opposed to vector graphics) and (ii) invoking graphics libraries to generate the appropriate graphic primitives to place on the display list.

In Step 426, a determination is made about whether there are additional entries in the Typesetting Program Output File to process. If there are additional entries in the Typesetting Program Output File to process, then the method proceeds to Step 418, where another entry is selected; otherwise the method ends. In Step 428, HLG object recording is performed on a per-page basis to generate an ItemHandles List for each page in the print job. Step 428 is detailed in FIG. 4C. In Step 430, the display list is generated using the Typesetting Program Output File and the ItemHandle lists generated in Step 428. Step 430 is detailed in FIGS. 4D and 4E.

Figure 4C:
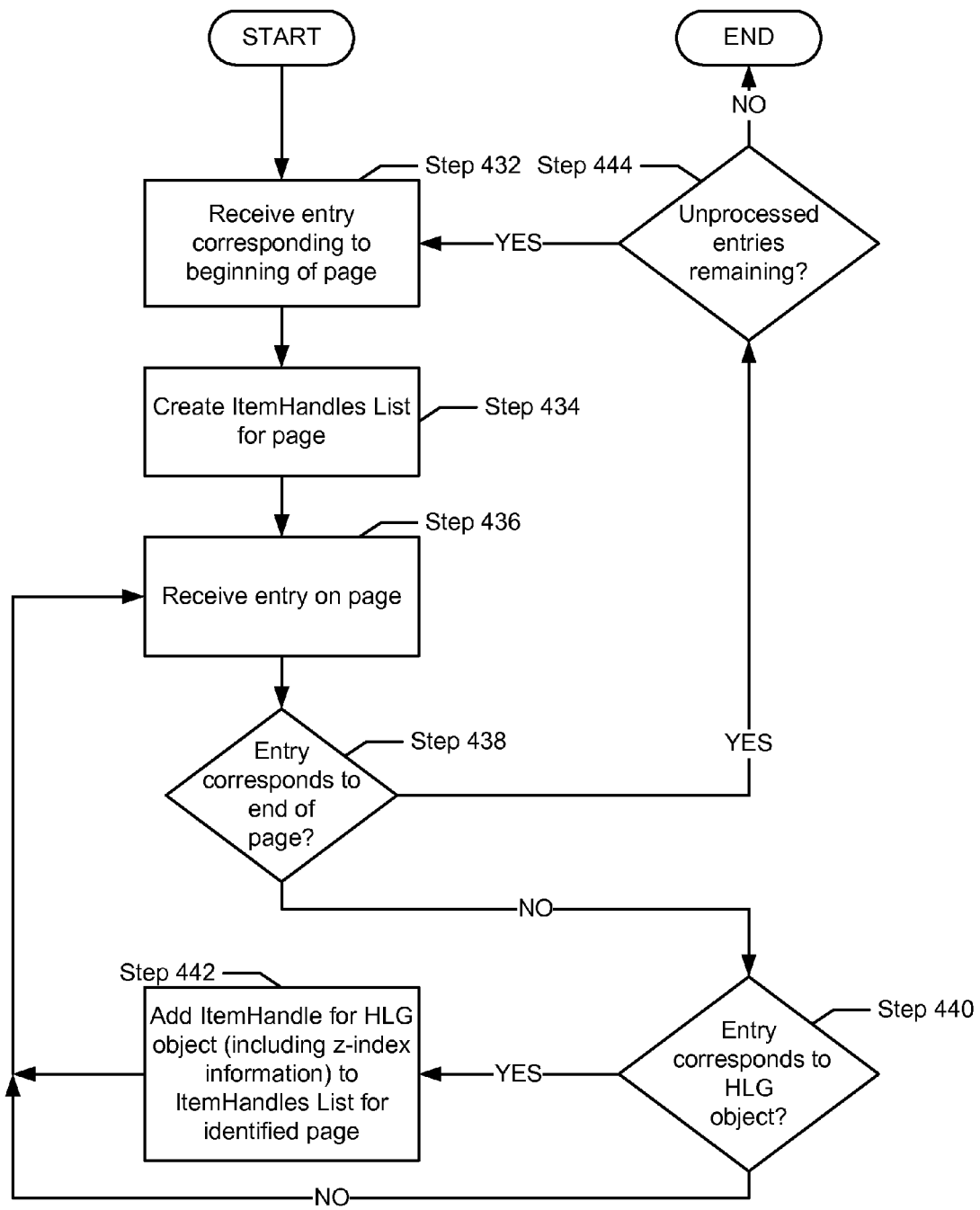

Referring to FIG. 4C, prior to Step 432, parsing of the Typesetting Program Output File is initiated to generated a series of entries. In Step 432, an entry (output from a process that is parsing of the Typesetting Program Output File) corresponding to the beginning of a page is received. In Step 434, an ItemHandles List for the page is created. In Step 436, an entry (output from a process that is parsing of the Typesetting Program Output File) from the page is received. In Step 438, a determination is made about whether the entry corresponds to the end of the page. If the entry corresponds to the end of the page, the process proceeds to Step 444; otherwise the process proceeds to Step 440.

In Step 440, a determination is made about whether the entry corresponds to a HLG object. If the item corresponds to a HLG object, the method proceeds to Step 442; otherwise, the method proceeds to Step 436.

In Step 442, an ItemHandle for the HLG object is added to the ItemHandles list for the page created in Step 434. The ItemHandle for the HLG object includes a pointer to the HLG object and the position of the HLG on the page. In Step 444, a determination is made about whether additional unprocessed entries remain in Typesetting Program Output File. If additional unprocessed entries remain in Typesetting Program Output File, the method proceeds to Step 432; otherwise the method ends.

Figure 4D:
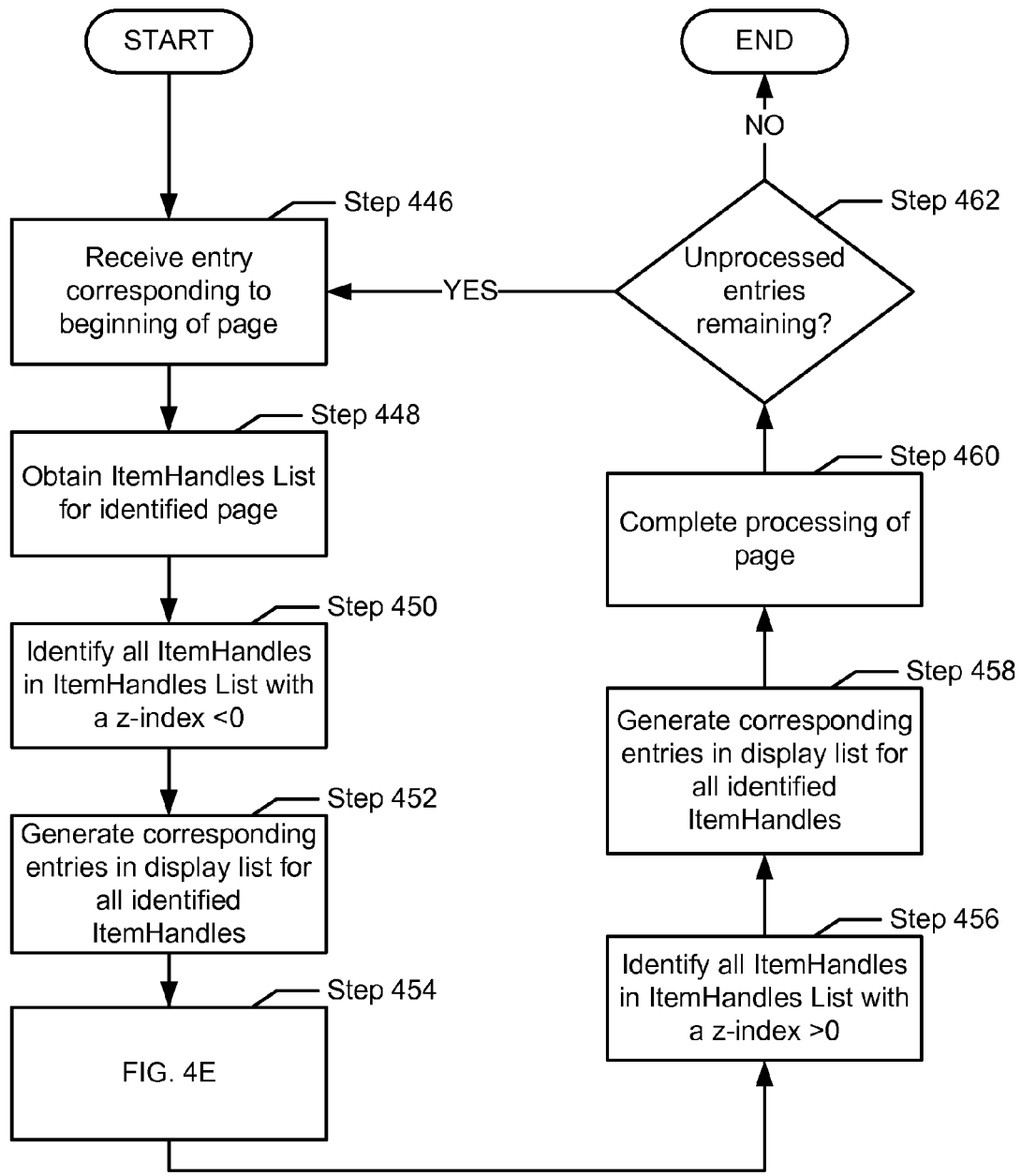

Referring to FIG. 4D, prior to Step 446, parsing of the Typesetting Program Output File is in initiated to generate a series of entries. The Typesetting Program Output File may correspond the Typesetting Program Output File generated in Step 414 or the Typesetting Program Output File may corresponds a Typesetting Program Output File generated by re-processing the Typesetting Program Input File by the Typesetting Program to generate a new Typesetting Program Output File.

Referring to Step 446, an entry (output from a process that is parsing of the Typesetting Program Output File) corresponding to the beginning of a page is received. In Step 448, the ItemHandles list for the page identified in Step 446 is obtained. In Step 450, all ItemHandles in the ItemHandles list obtained in Step 448 that have a z-index <0 are identified.

In Step 452, all ItemHandles identified in Step 450 are processed to generate appropriate entries on the display list. In one embodiment of the invention, processing the ItemHandles includes obtaining HLG object using the pointer specified in the ItemHandle and invoking the appropriate graphics library routines to generate the corresponding entries on the display list. After Step 452 is completed all of the HLG objects below the in-line plane have been processed and added to the display list. The process then proceeds to perform the steps in FIG. 4E.

Figure 4E:
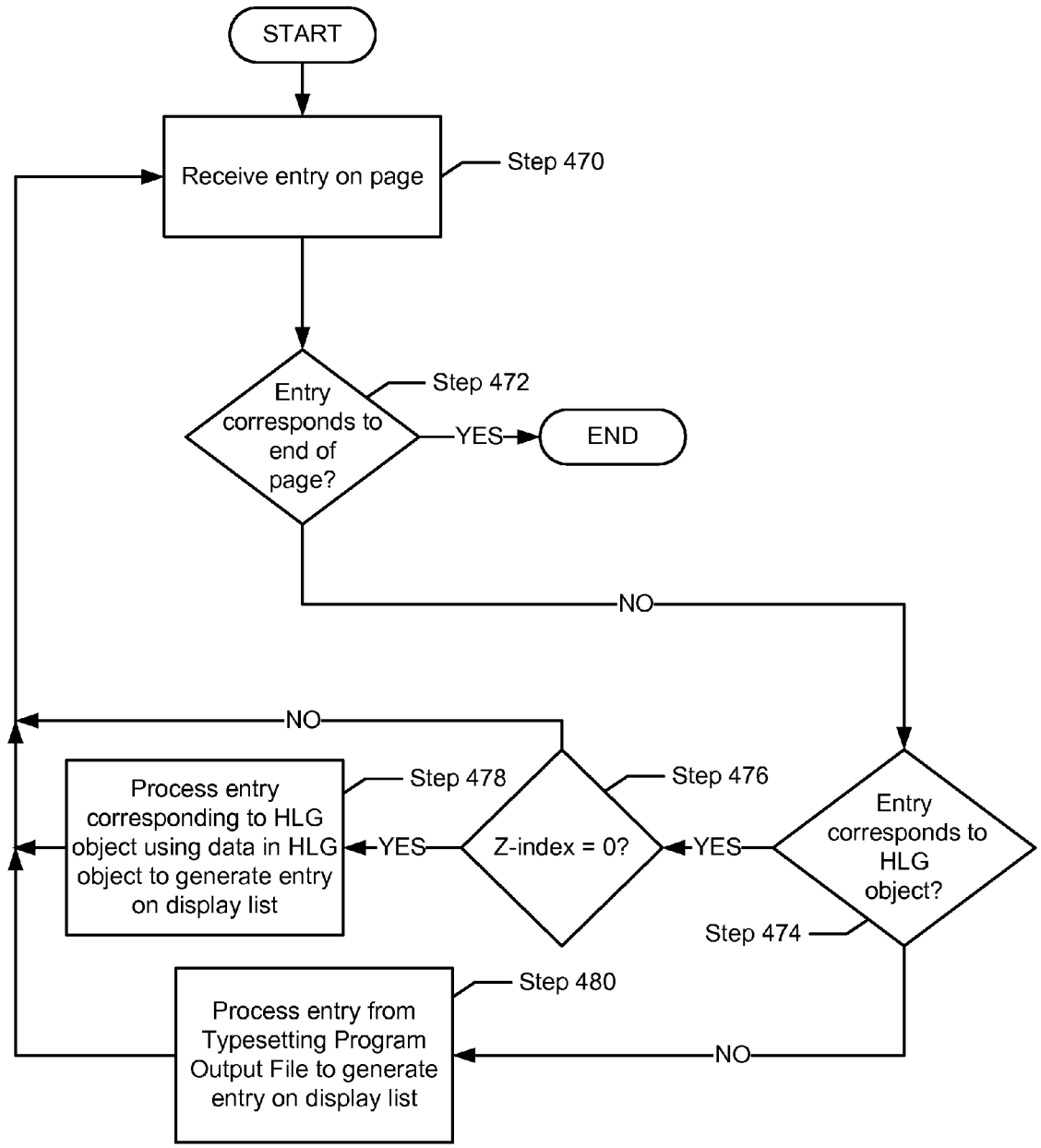

Referring to FIG. 4E, FIG. 4E details the processing of the in-line text and HLG objects in the Typesetting Program Output File. Turning to Step 470, in Step 470, an entry (output from a process that is parsing of the Typesetting Program Output File) from the page is received. In Step 472, a determination is made about whether the entry corresponds to the end of the page. If the entry corresponds to the end of the page, the process proceeds ends; otherwise the process proceeds to Step 474.

In Step 474, a determination is made about whether the entry corresponds to a HLG object. If the item corresponds to a HLG object, the method proceeds to Step 476; otherwise, the method proceeds to Step 480. In Step 476, a determination is made about whether the z-index of the HLG object equals zero. If the z-index of the HLG object is equal to zero, the process proceeds to Step 478, otherwise the process proceeds to Step 470. In Step 478, the HLG object is processed to generate to appropriate entries on the display list. In one embodiment of the invention, processing the HLG object includes using the pointer to the HLG object specified in the ItemHandle and invoking the appropriate graphics library routines to generate the corresponding entries on the display list. The process then proceeds to Step 470. In Step 480, the entry is processed to generate a corresponding entry in the display list. Step 480 is essentially the same as Step 422, discussed above in reference to FIG. 4B. The method then proceeds to Step 470.

Returning to FIG. 4D, in Step 456, all ItemHandles in the ItemHandles list obtained in Step 448 that have a z-index >0 are identified. In Step 458, all ItemHandles identified in Step 456 are processed to generate to appropriate entries on the display list. In one embodiment of the invention, processing the ItemHandle includes obtaining the HLG object using the pointer specified in the ItemHandle and invoking the appropriate graphics library routines to generate the corresponding entries on the display list. After Step 458 is completed all of the HLG objects above the in-line plane have been processed and added to the display list. The process then proceeds to Step 460.

In Step 460, the processing of the page is completed. In one embodiment of the invention, completing the processing of the page may include invoking any other graphics library routines or other processes required to completed the processing of the page. In Step 462, a determination is made about whether there are any unprocessed entries in the Typesetting Program Output File. If there are any unprocessed entries in the Typesetting Program Output File, the method proceeds to Step 446; otherwise the method ends.

The follow examples illustrate various embodiments of the invention and are not intended to limit the scope of the invention.

FIG. 5 shows an example page (599) that includes three HLG objects and text. As shown in FIG. 5, HLG A (502) is below the in-line plane, HLG B (504) and the Text (505) are on the in-line plane, and HLG C (506) is above the in-line plane. In accordance with one or more embodiments of the invention, the z-index for HLG A (502) is less than 0, the z-index for HLG B (504) is 0, and the z-index for HLG C (506) is greater than zero.

Figure 6:
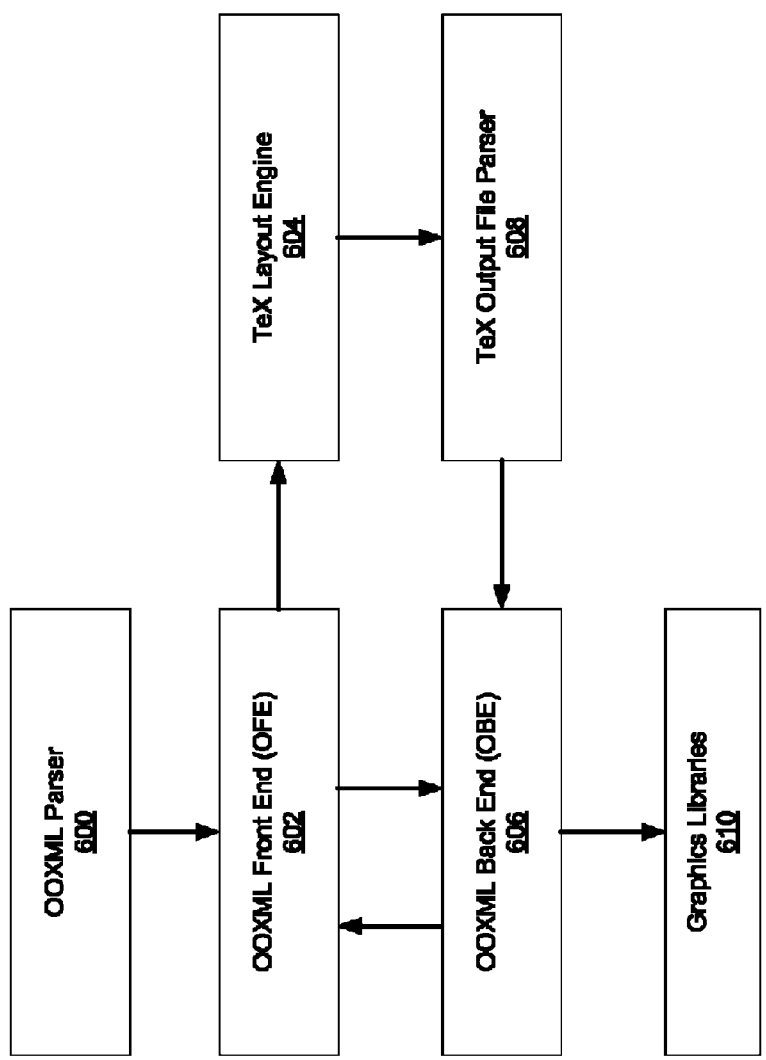

FIG. 6 shows an example software architecture in accordance with one or more embodiments of the invention. The software architecture includes the following modules, implemented as computer program code: an OOXML Parser (600), an OOXML Front End (OFE) (602), a TeX Layout Engine (604), a OOXML Back End (OBE) (606), and a TeX Output File Parser (608), and graphics libraries (610). Each of these components is described below.

The OOXML parser (600) is configured to receive documents encoded in OOXML and subsequently parse the documents to obtain parsed OOXML data. The parsed OOXML data is then forwarded to the OFE (602). The OFE (602) is configured to perform the Steps shown in FIG. 4A above to generate a TeX Input File. The OFE (602) is further configured to determine whether the TeX Input File includes any HLG objects with a z-index zero (Step 416 in FIG. 4B).

The TeX Input File is forwarded to the TeX Layout Engine (604) to generate a TeX Output File. The TeX Output File is subsequently processed by the TeX Ouput File Parser (608), the OBE (606) and the Graphics Libraries (610) (or more specifically, using routines in the Graphic Library (610)).

The TeX Ouput File Parser (608) is configured to parse the TeX Ouput File and forward the results of the parsing to the OBE (606). The OBE (606) is configured to perform a first pass of the results of parsing the TeX Output File by performing Step 428 and configured to maintain the ItemHandles Lists. The OBE (606) is further configured to perform a second pass of the results of parsing the TeX Output File by performing Step 430.

The graphics libraries (610) include the necessary routines to generate the appropriate entries on the display list for the text, images, and vector graphics in the document. The OBE (606) is configured to call into the graphics libraries to initiate the performance of the routines to generate the corresponding entries on the display list.

Those skilled in the art will appreciate that while embodiments of the invention have been directed to generating a display list for use in generating a printed document, embodiments of the invention may be used to generate a display list for outputting an image on to a display, e.g., a monitor.

Computer readable program code to perform embodiments of the invention may be stored on a computer readable medium such as a compact disc (CD), a diskette, a tape, physical memory, or any other physical computer readable storage medium that includes functionality to store computer readable program code to perform embodiments of the invention. In one embodiment of the invention the computer readable program code, when executed by a processor(s), is configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising computer readable program code embodied therein for causing a processor to perform a method, the method comprising:
   receiving a print request to print a document encoded in a markup language;
   parsing the document to identify an image and text;
   creating a first high-level graphics (HLG) object corresponding to the image, wherein the first HLG object specifies a first z-index for the first HLG object and wherein the first z-index is less than zero;
   generating, in response to the print request, a first entry in a typesetting program input file comprising a pointer to the first HLG object;
   generating, in response to the print request, a second entry in the typesetting program input file corresponding to the text;
   generating, in response to the print request, a typesetting program output file using a typesetting program and the typesetting program input file,
   wherein the first entry in the typesetting program input file is ignored by the typesetting program;
   making, in response to the print request, a determination that the z-index for the first HLG object is not equal to zero; and
   based on the determination:
      parsing the typesetting output file to identify a page of the document, wherein the text and the first HLG object are located on the page;
      creating an ItemHandles List for the page, wherein the typesetting program output file exists before the ItemHandles List, and wherein the ItemHandles List is created based on the typesetting program output file;
      adding a first ItemHandle corresponding to the first entry to the ItemHandles List, wherein the first ItemHandle comprises the pointer to the first HLG object and a position for the first HLG object on the pace,
      wherein the typesetting program input file and the document encoded in the markup language do not have the position; and
      generating a display list for the page using the typesetting program output file and the ItemHandles List.

2. The non-transitory computer readable medium of claim 1, further comprising:
   parsing the document to identify vector graphics;
   creating a second high-level graphics (HLG) object corresponding to the vector graphics, wherein the second HLG object specifies a second z-index for the second HLG object; and
   generating a third entry in the typesetting program output file corresponding to the second HLG object, wherein the third entry comprises a pointer to the second HLG object.

3. The non-transitory computer readable medium of claim 2, wherein the second z-index is greater than zero.

4. The non-transitory computer readable medium of claim 2, wherein generating the display list comprises:
   (a) identifying all ItemsHandles in the ItemsHandles List with a z-index less than zero to obtain a first set of ItemsHandles;
   (b) generating in the display list, after (a), a first set of display list entries corresponding to the first set of ItemsHandles;
   (c) generating in the display list, after (b), a second set of display list entries corresponding to the second entry;
   (d) identifying, after (c), all ItemsHandles in the ItemsHandles List with a z-index greater than zero and to obtain a third set of ItemsHandles; and
   (e) generating in the display list, after (d), a third set of display list entries corresponding to the third set of ItemsHandles.

5. The non-transitory computer readable medium of claim 1, wherein the typesetting program is a TeX layout engine.

6. The non-transitory computer readable medium of claim 1, wherein the typesetting program input file is a TeX input file.

7. The non-transitory computer readable medium of claim 1, wherein the markup language is Open Office Extensible Markup Language (OOXML).

8. The non-transitory computer readable medium of claim 7, wherein document is parsed using an OOXML parser.

9. The non-transitory computer readable medium of claim 1, wherein the first HLG object comprises a reference to native image data for the image.

10. The non-transitory computer readable medium of claim 1, wherein the first entry in the typesetting program input file is encapsulated with a command ignored by the typesetting program.

11. A printer, comprising:
   a processor;
   memory comprising computer readable program code, which when executed by the processor, causes the printer to perform a method, the method comprising:
      receiving a print job for a document, wherein the document is encoded in a markup language;
      parsing the document to identify an image and text;

creating a first high-level graphics (HLG) object corresponding to the image, wherein the first HLG object specifies a first z-index for the first HLG object and wherein the first z-index is less than zero;

generating, in response to the print job, a first entry in a typesetting program input file comprising a pointer to the first HLG object;

generating, in response to the print job, a second entry in the typesetting program input file corresponding to the text;

generating, in response to the print job, a typesetting program output file using a typesetting program and the typesetting program input file, wherein the first entry in the typesetting program input file is ignored by the typesetting program;

making, in response to the print job, a determination that the z-index for the first HLG object is not equal to zero;

based on the determination:
parsing the typesetting output file to identify a page in the print job, wherein the text and the first HLG object are located on the page;
creating an ItemHandles List for the page, wherein the typesetting program output file exists before the ItemHandles List, and wherein the ItemHandles List is created based on the typesetting program output file;
adding a first ItemHandle corresponding to the first entry to the ItemHandles List, wherein the first ItemHandle comprises the pointer to the first HLG object and a position for the first HLG object on the page,
wherein the typesetting program input file and the document encoded in the markup language do not have the position; and
generating a display list for the page using the typesetting program output file and the ItemHandles List; and a print engine configured to print the document, using the display list.

12. The printer of claim 11, the method further comprising:
parsing the document to identify vector graphics;
creating a second high-level graphics (HLG) object corresponding to the vector graphics, wherein the second HLG object specifies a second z-index for the second HLG object; and
generating a third entry in the typesetting program output file corresponding to the second HLG object, wherein the third entry comprises a pointer to the second HLG object.

13. The printer of claim 12, wherein the second z-index is greater than zero.

14. The printer of claim 12, wherein generating the display list comprises:
(a) identifying all ItemsHandles in the ItemsHandles List with a z-index less than zero to obtain a first set of ItemsHandles;
(b) generating in the display list, after (a), a first set of display list entries corresponding to the first set of ItemsHandles;
(c) generating in the display list, after (b), a second set of display list entries corresponding to the second entry;
(d) identifying, after (c), all ItemsHandles in the ItemsHandles List with a z-index greater than zero and to obtain a third set of ItemsHandles; and
(e) generating in the display list, after (d), a third set of display list entries corresponding to the third set of ItemsHandles.

15. The printer of claim 11, wherein the typesetting program is a TeX layout engine.

16. The printer of claim 11, wherein the typesetting program input file is a TeX input file.

17. The printer of claim 11, wherein the markup language is Open Office Extensible Markup Language (OOXML).

18. The printer of claim 17, wherein document is parsed using an OOXML parser.

19. The printer of claim 11, wherein the printer is one selected from a group consisting of a laser printer, an inkjet printer, and a copier.

20. The printer of claim 11, wherein the first entry in the typesetting program input file is encapsulated with a command ignored by the typesetting program.

21. A non-transitory computer readable medium comprising computer readable program code embodied therein for causing a processor to perform a method, the method comprising:
receiving a print request to print a document encoded in a markup language;
parsing the document to identify an image and text;
creating a first high-level graphics (HLG) object corresponding to the image, wherein the first HLG object specifies a first z-index for the first HLG object and wherein the first z-index is less than zero;
generating, in response to the print request, a first entry in a typesetting program input file comprising a pointer to the first HLG object;
generating, in response to the print request, a second entry in the typesetting program input file corresponding to the text;
generating, in response to the print request, a first typesetting program output file using a typesetting program and the typesetting program input file,
wherein the first entry in the typesetting input file is ignored by the typesetting program;
parsing the first typesetting output file to generate first parsed data;
using the first parsed data:
creating an ItemHandles List for a page in the document, wherein the typesetting program output file exists before the ItemHandles List, and wherein the ItemHandles List is created based on the typesetting program output file; and
adding a first ItemHandle corresponding to the first entry to the ItemHandles List, wherein the first ItemHandle comprises the pointer to the first HLG object and a position for the first HLG object on the page,
wherein the typesetting program input file and the document encoded in the markup language do not have the position;
generating a second typesetting program output file using a typesetting program and the typesetting program input file;
parsing the second typesetting output file to generate second parsed data;
generating a first display list entry for the first entry using the second parsed data and the ItemHandles List; and
generating, after generating the first display list entry, a second display list entry for the second entry using the second parsed data.

22. The non-transitory computer readable medium of claim 21, wherein the first typesetting output file is in a device independent file format.

23. The non-transitory computer readable medium of claim 22, wherein the ItemHandle List is maintained by a OOXML backend.

24. The non-transitory computer readable medium of 21, wherein the markup language is Open Office Extensible Markup Language (OOXML) and wherein document is parsed using an OOXML parser.

25. The non-transitory computer readable medium of claim 21, wherein the first entry in the typesetting program input file is encapsulated with a command ignored by the typesetting program.

* * * * *